United States Patent [19]

Price

[11] 4,121,263
[45] Oct. 17, 1978

[54] METHOD AND APPARATUS FOR CONTROL SIGNAL SEPARATION TO REGAIN SYNCHRONIZATION BETWEEN A VISUAL IMAGE PROJECTOR AND AN AUDIO PROGRAM

[75] Inventor: Arthur B. Price, Byron, N.Y.

[73] Assignee: The Singer Company, New York, N.Y.

[21] Appl. No.: 819,430

[22] Filed: Jul. 27, 1977

[51] Int. Cl.² .................... G11B 5/43; G11B 5/22
[52] U.S. Cl. ........................ 360/27; 360/122; 360/130
[58] Field of Search ............ 360/72, 74, 122, 20, 360/18, 21, 75, 78, 70, 130, 105

[56] References Cited

U.S. PATENT DOCUMENTS

| | | | |
|---|---|---|---|
| 2,866,011 | 12/1958 | Kornél | 360/122 |
| 3,219,353 | 11/1965 | Prentky | 360/135 |
| 3,456,249 | 7/1969 | Pear, Jr. | 360/105 |
| 3,541,271 | 11/1970 | Joslow et al. | 360/72 |
| 3,939,491 | 2/1976 | Shigeta | 360/85 |
| 3,950,782 | 8/1976 | Carey et al. | 360/72 |
| 3,996,671 | 12/1976 | Foster | 360/72 |
| 4,032,897 | 6/1977 | Pooley | 360/72 |
| 4,040,100 | 8/1977 | Chan | 360/72 |

FOREIGN PATENT DOCUMENTS 810,111  5/1955  United Kingdom ............ 360/74

Primary Examiner—Vincent P. Canney
Attorney, Agent, or Firm—Charles R. Lewis

[57] ABSTRACT

Method and apparatus for use with a magnetic tape playback machine to attenuate recorded audio signals relative to the super-imposed control signals while the magnetic tape is being transported past the sensing surface of a playback head. The control signals are recorded in a frequency range which is lower than the frequency range of the recorded audio signals. A spacer is attached to the sensing surface of the playback head to space the magnetic tape a preselected distance from the sensing surface and thereby attenuate the higher frequency audio signals relative to the lower frequency control signals. The higher frequency attenuation obtained is independent of the frequency of the signals induced into the playback head and is thereby independent of the linear velocity of the magnetic tape as it is transported past the sensing surface of the playback head. The relatively unattenuated control signals may be obtained during fast forward or rewind of the magnetic tape playback machine and used to quickly regain synchronization between a visual image projector and an associated magnetic tape playback machine when one has been operated out of synchronization with respect to the other.

46 Claims, 17 Drawing Figures

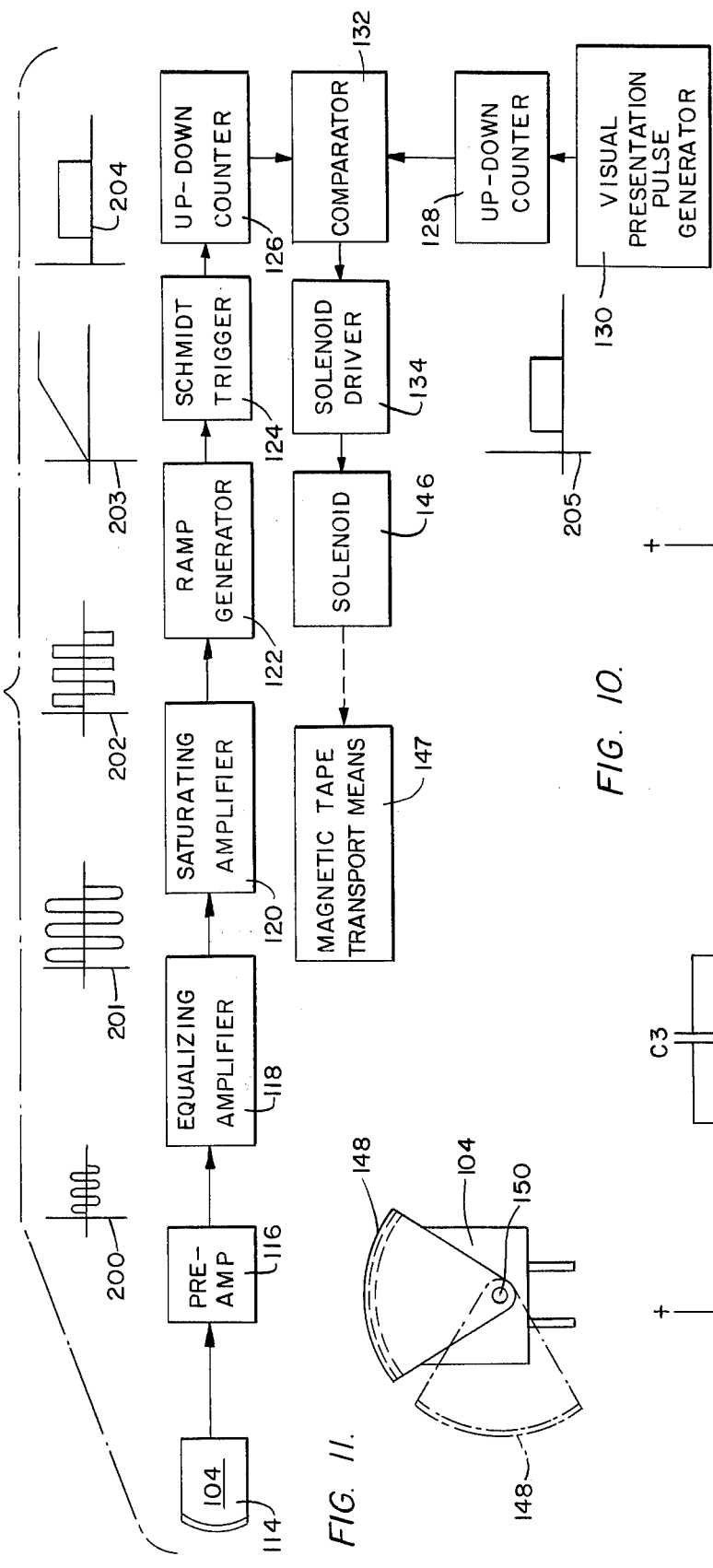
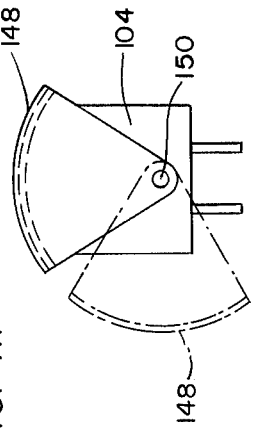
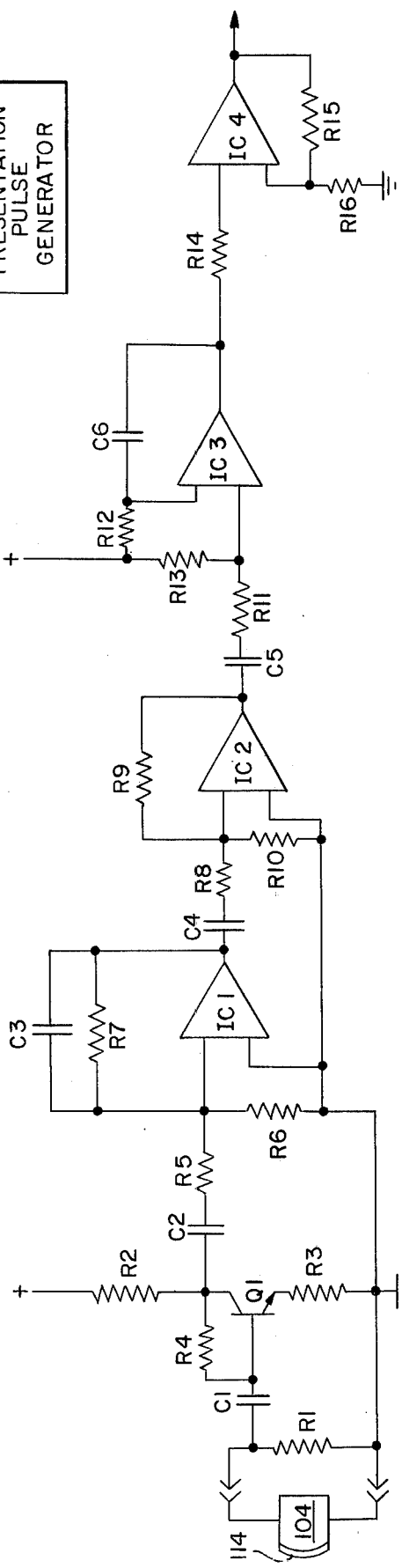
FIG. 8.
FIG. 11.
FIG. 10.

METHOD AND APPARATUS FOR CONTROL SIGNAL SEPARATION TO REGAIN SYNCHRONIZATION BETWEEN A VISUAL IMAGE PROJECTOR AND AN AUDIO PROGRAM

BACKGROUND OF THE INVENTION

1. Field of Invention

The present invention relates to audio-visual equipment utilizing a visual image projector operating in synchronism with control signals and audio program signals recorded on magnetic tape. More specifically, the present invention relates to means to separate or attenuate lower frequency control signals from higher frequency audio program signals during fast forward or rewind of the magnetic tape transport means to regain synchronization between the visual image projected and the audio program recorded on the magnetic tape.

2. Description of the Prior Art

A species of audio-visual equipment intended for educational use utilizes a compact cassette magnetic tape playback machine operating in synchronism with a visual image projector such as a slide or filmstrip projector. Typically, two types of signals are recorded on the magnetic tape. Audio signals are recorded to provide an audio instruction program to accompany the visual presentation, and cue tone bursts are recorded to provide control signals to advance a slide or filmstrip frame at an appropriate point in the audio instruction program. Cue tone control signals may also be provided for other instructional purposes.

Visual presentation is defined as the visual image projected by a projector from a film media (i.e. slide or filmstrip) and visual advance is defined as the change from one visual presentation to another. Visual advance may be initiated by manual operation of the projector controls or automatically thru means responsive to the recorded cue tones control signals.

The recording of the audio instruction program and the cue tone control signals may be done in accordance with either a super-imposed system or a separate track system as specified in American National Standards Institute (ANSI) specification P.H. 7.4-1975.

The super-imposed system provides for the recording of low frequency cue tone bursts on the same track as the audio instruction program. The cue tone burst may be recorded simultaneously with, and/or in sequential relation to the audio information signal. In the case of simultaneous super-imposed recording, the cue tone burst is recorded directly over the audio information signal. In the case of sequential super-imposed recording, the audio information signal is recorded between adjacent cue tone bursts. As used herein, the terms super-imposed, and mixed denote either simultaneous or sequential super-imposed recording. The cue tones consist of 50 Hz ± 5% tone burst. The burst time duration is 0.45 ± 0.07 seconds for visual advance and 2.00 ± 0.25 seconds for visual advance and program stop. During playback the magnetic tape transport means transports the magnetic tape past the sensing surface of a playback head. The playback head picks up both the audio instruction program signals and the cue tone control signals for reproduction. In order to prevent the lower frequency portion of the audio instruction program signals from being misinterpreted as a cue tone control signal and causing a spurious visual advance, the output of the playback head is passed thru one or more frequency responsive filters to effectively separate the audio signals from the control signals. As shown in FIG. 1, the filter(s) may be a high pass filter having a transition frequency of 125 Hz and a minimum attenuation rate of 24 db/octave. The audio program is then presented to the student thru a loudspeaker or earphone and the cue tone control signals are used to provide visual advance synchronized with the audio program.

The separate track system records the audio program on a first track and the cue tone on a second track. A 1,000 Hz cue tone is provided for visual advance and a 150 Hz cue tone is provided to stop the program. In addition, a 400 Hz and a 2300 Hz cue tone may be provided for unassigned control purposes. A first reproduce head picks up the audio signals from the first track and a second reproduce head picks up the control signals from the second track. Frequency selective filters then separate the various cue tones to perform their intended control functions.

The superimposed and separate track systems both have advantages and disadvantages. The superimposed system allows for the maximum recorded audio instruction program time for each compact cassette but the frequency restricted cue tone limits the number of control functions. Also, it is very difficult to rearrange the cue tones once the superimposed audio program and cue tone signals have been recorded. The separate track system allows a larger number of control functions and permits convenient erasing and rearranging of the cue tones. However, the use of a separate track system reduces the amount of audio program material that can be recorded to one half that of the superimposed systems.

A draw back of existing audio visual equipment using the superimposed system is that it is difficult to maintain audio visual synchronization when returning to a prior point in the audio visual program, or when advancing to a subsequent point in the program.

The following two examples illustrate these drawbacks.

1. A student desires to return to a prior point in the audio-visual program to review material. Using the manual control provided on the projector the student decrements the visual presentation in the reverse direction until the desired visual presentation is reached. The tape transport is then rewound on a trial and error basis until the appropriate point on the audio program is located. The synchronized audio-visual program is then resummed.

2. A student desires to advance to a subsequent point in the audio visual presentation to avoid material previously learned. Using the manual control provided on the projector, the student increments the visual presentation in the forward direction until the desired visual presentation is reached. The tape transport is then fast forwarded on a trial and error basis until the appropriate point in the audio program is located. The synchronized audio-visual program is then resummed.

As is readily apparent, any departure from the predetermined audio-visual program requires the student to fast forward or rewind on a trial and error basis to locate the appropriate point in the audio program. It would be very desirable to provide means for automatically retaining or regaining audio-visual synchronization during or after rapid manual incrementing of the visual program in a forward direction or decrementing of the visual program in a reverse direction.

Audio-visual synchronization can be automatically regained if slide or filmstrip frame changes ae counted as they are manually incremented or decremented, and the cue tones counted during the fast forward or rewind. When the two counts are equal, the tape transport can be stopped and the synchronized audio-visual program resummed. Counter means can be readily provided which increment one unit for each slide or filmstrip change in a forward direction or decrement one unit for each slide or filmstrip change in a reverse direction. As a practical matter, it has proven difficult, if not impossible, to accurately count the cue tones during fast forward or rewind. Conventional tape transports for compact cassettes provide a relatively constant angular velocity to the take up reel spindle. As the tape winds onto the take up reel, the effective radius of the take up reel increases. The linear velocity or speed of the tape being transported past the playback head is a function of the effective radius of the take up reel. During an end to end rewind or fast forward of a conventional compact cassette the linear tape velocity past the reproduce head can vary from approximately six to 24 times the normal tape playig speed of 1.875 in/sec (4.76 cm/sec). Thus the linear tape velocity can vary from a low of 11.25 in/sec (28.56 cm/sec) to a high of 45 in/sec (114.24 cm/sec). The frequency of the voltage induced into the playback head is directly proportional to the linear tape velocity past the head. During end-to-end rewind or fast forward of a conventional compact cassette the recorded 50 Hz cue tones can induce a signal ranging in frequency from 300 Hz to 1,200 Hz, and the low frequency portion of the audio program (125 Hz) can induce a playback signal ranging from 750 Hz to 3,000 Hz. As shown in FIG. 2, induced voltage frequency ranges of the cue tones and the audio program overlap in region "A." The 50 Hz filters used to separate the superimposed cue tones and audio program during normal playback can not be used during rewind or fast forward. A pre-set filter for the range of cue tone frequencies (FIG. 2, "B") cannot be used since the audio program material overlapping in region "A" can pass through the filter and be misinterpreted as a cue tone to cause a spurious visual advance count.

Applicant is aware of at least one attempt to accurately count the superimposed cue tones during fast forward (but not rewind). A conventional compact cassette tape transport is modified to provide capstan controlled fast forward. The capstan drive assures a constant linear tape velocity past the playback head, and induced cue tone and audio program frequencies in well defined, mutually exclusive ranges. A pre-set filter is used to separate the cue tone signals from the audio program signals. However, fast forward velocities greater than three times the normal playback velocity have been difficult to achieve. Also, mass produced compact cassette tape transports cannot be readily modified to provide capstan controlled rewind.

Applicant's invention provides a novel means of accurately separating the cue tones from the audio program material during fast forward and rewind in such a manner that the audio program material will not cause a spurious cue tone count and without modification of the conventional tape transport drive mechanism.

SUMMARY OF THE INVENTION

Method and apparatus for use with a magnetic tape playback machine to attenuate recorded audio signals relative to the superimposed control signals where the audio signals occupy a first frequency range and the control signals occupy a second frequency range and where the second frequency range is less than the first frequency range. A magnetic tape transport means for supporting and transporting a magnetic tape includes a playback head having a sensing surface for sensing signals recorded on magnetic tape. A spacer is mounted on the sensing surface of the playback head to space magnetic tape a preselected distance from the sensing surface as the magnetic tape is transported past the sensing surface by the transport means. The spacer effectuates the attenuation of the higher frequency audio signals relative the lower frequency control signals. The higher frequency attenuation obtained is independent of the frequency of the signals induced into the playback head and is thereby independent of the linear velocity of the magnetic tape as it is transported past the sensing surface of the playback head. The relatively unattenuated control signals may be obtained during fast forward or rewind of the magnetic playback machine and used to quickly regain synchronization between a visual image projector and an associated magnetic tape playback machine when one has been operated out of synchronism with respect to the other.

BRIEF DESCRIPTION OF THE DRAWINGS

The present invention will be fully understood from consideration of the following detailed description of the preferred embodiment taken in conjunction with the accompanying drawings, in which like reference characters refer to like structure in the several views, and wherein;

FIG. 8 is a functional block diagram of electronic means to process the output of the playback head;

FIG. 10 is a schematic diagram of an electrical circuit which performs some of the functions illustrated in FIG. 8; and FIG. 11 is a plan view of a playback head and moveable spacer.

DESCRIPTION OF THE PREFERRED EMBODIMENT

Figure 1:
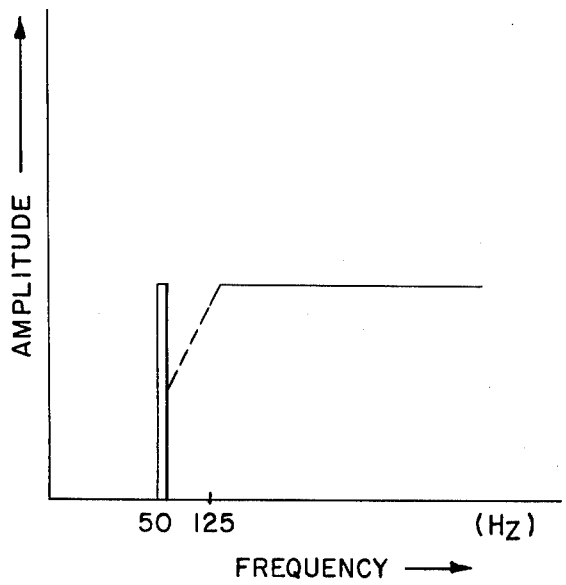
FIG. 1 is an idealized graphical representation of the control and audio signal amplitudes (ordinate) with respect to frequency (abscissa) during normal playback speeds.
Figure 2:
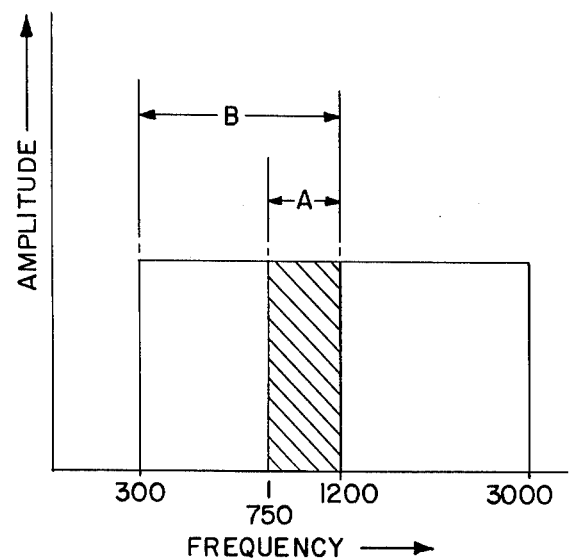
FIG. 2 is an idealized graphical representation of the control and audio signal amplitude (ordinate) with respect to frequency (abscissa) during rewind or fast forward tape speeds.
Figure 3:
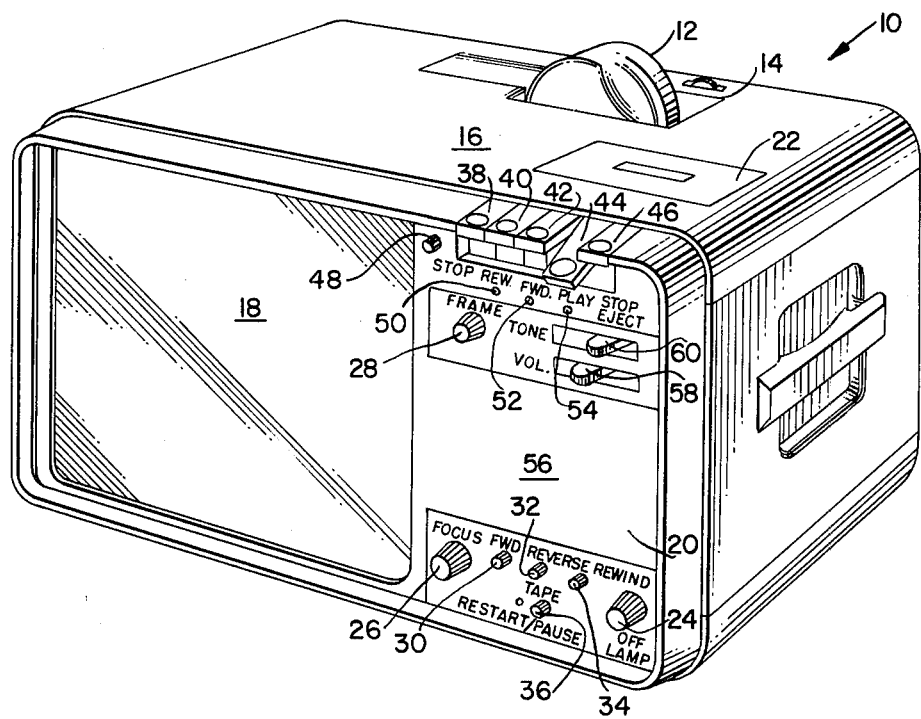
FIG. 3 is a perspective view of a filmstrip audio-visual projector which may be utilized with the present invention.

The applicant's invention may be incorporated into a visual image projector such as the rear screen filmstrip projector 10 shown in perspective view in FIG. 3. The projector includes a filmstrip containing cartridge 12 mounted in a cavity 14 on the top surface 16 of the projector 10. The filmstrip (not shown) is withdrawn from the cartridge 12 by filmstrip transport means (not shown) and incremented on a frame by frame basis past projection means (not shown) for projection onto the viewing screen 18 located on the front panel 20 of the projector 10. The applicant's invention may also be incorporated into other types of audio-visual equipment, including, but not limited to, a slide projector. A hinged access door 22 is provided on the top surface 16 of the projector 10 to permit the mounting of a compact cassette onto a conventional magnetic tape transport means (not shown) located within the projector 10. The filmstrip projector 10 controls includes an on/off knob 24, an image focus control 26, a framing control 28, a push button 30 for manual incrementing of the filmstrip in a forward direction, a push botton 32 for manual decrementing of the filmstrip in a reverse direction, and another push button 34 to rewind the filmstrip into the filmstrip cartridge 12. A restart/pause button 36 is provided to allow the projector operator to selectively interrupt the audio visual program. The magnetic tape transport controls include five depressable keys 38, 40, 42, 44, and 46. The first key 38 initiates a stop command, the second key 40 initiates the magnetic tape rewind mode, the third key 42 initiates a fast forward mode, the fourth key 44, shown in the depressed position in FIG. 3, initiates a playback mode, and the fifth key 46 initiates the stop command and ejects the compact cassette. A push button 48 is used to provide the electronic means, described in more detail below, with an initial synchronism signal. Three indicator means, such as light emitting diodes 50, 52, and 54 are located beneath the magnetic tape transport keys 38, 40, 42, 44, 46 and provide indications to the projector operator as described below. A magnetic tape transport means suitable for use with the present invention is model number CT-1901C manufactured by the Vortex manufacturing company of Tokyo, Japan.

The projector 10 is provided with conventional playback electrical circuits (not shown) responsive to the superimposed cue tones and audio program signals recorded on the compact cassette. During normal play (1.875 in/sec) the cue signals are separated from the audio signals by these electrical circuits. The cue tones provide visual advance in synchronism with the audio program which is reproduced thru a loudspeaker (not shown) located behind a perforated portion 56 of the front panel 20. A slide control 58 is used to control the audio volume, and another slide control 60 is used to control the audio tone.

A more detailed description of the filmstrip projector and cartridge illustrated in FIG. 3 may be had by referring to the following U.S. Patent Applications filed on Sept. 20, 1976:

Ser. Nos. 724,875; 724,879; 724,880; 724,881; and 724,882. These patent applications are assigned to the assignee of the present invention.

Figure 4:
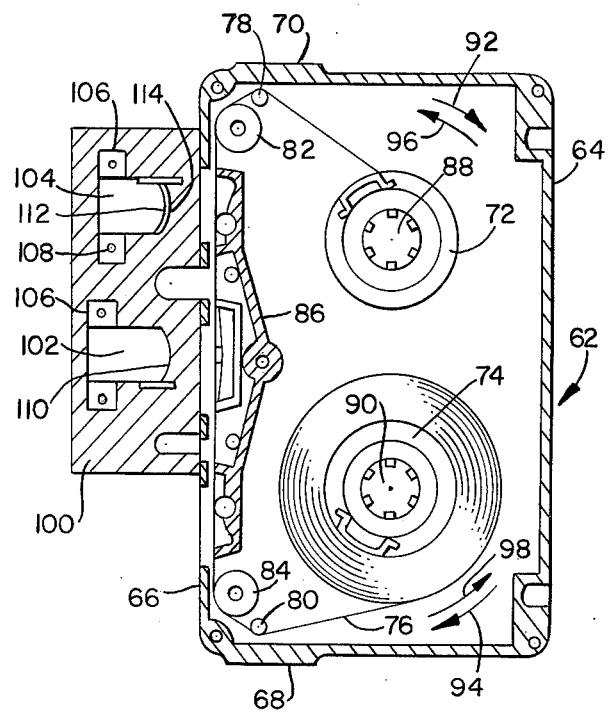
FIG. 4 is a plan view in partial section of two playback heads and a standard compact cassette with the heads retracted away from and out of engagement with the magnetic tape.
Figure 5:
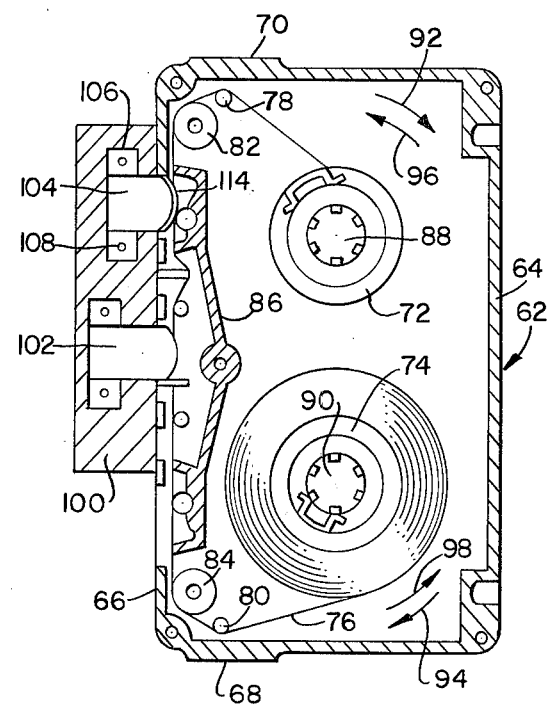
FIG. 5 is a plan view in partial section similar to the view shown in FIG. 4 but with the heads in operative engagement with the magnetic tape.

A partial plan view of the tape transport accessible thru the access door 22 with a conventional compact cassette 62 (in cross section) mounted in place is shown in FIG. 4 and FIG. 5. The compact cassette 62 includes a rear wall 64, a forward wall 66, and side walls 68 and 70. The interior of the cassette includes two rotatably mounted reels 72 and 74, and a supply of magnetic tape 76 connected therebetween. The magnetic tape 76 follows a path along the forward wall 66 of the compact cassette 62 as defined by a first guide pin 78, a second guide pin 80, a first roller 82, a second roller 84, and a partition 86. Two spindles 88 and 90 project upward from the transport means to engage the reel hubs, 72 and 74, respectively. The forward wall 66 includes the various openings thru which various guide pins, controllers, and pressure pads (not shown) may be brought to operative relation with the magnetic tape 76 by the transport means.

When the playback key 44 is depressed the reel 72 is caused to rotate in the direction of the arrow 92 to take up or accumulate the magnetic tape 76 while the reel 74 is caused to rotate in the direction of the arrow 94 to supply or pay off magnetic tape 76. During the play mode a capstan and pinch roller (not shown) engage the magnetic tape 76 to limit the linear velocity of the magnetic tape to the industry standard of 1.875 in/sec.

When the fast forward key 42 is depressed the reels 72 and 74 rotate in the same direction as for the playback mode described above but the linear velocity of the magnetic tape 76 is not controlled or otherwise limited by the capstan and pinch roller. As the magnetic tape 76 accumulates on the reel 72, the effective radius of the reel 72 increases thereby increasing the linear velocity of the magnetic tape 76. During an end to end fast forward of a conventional compact cassette the linear tape velocity can vary from approximately six to 24 times the standard play mode linear velocity of 1.875 in/sec.

When the rewind key 40 is depressed the direction of the reel rotation is reversed. The reel 72 rotates in the direction of the arrow 96 and the reel 74 rotates in the direction of the arrow 98. As in the case of the fast/forward mode, the linear velocity of the magnetic tape 76 is not controlled or otherwise limited by the capstan and pinch roller. As the magnetic tape 76 accumulates on the reel 74, the effective radius of the reel 74 increases thereby increasing the linear velocity of the tape.

A sub-chassis 100 is mounted adjacent the forward wall 66 of the compact cassette 62 and is reciprocally moveable in a direction perpendicular to the forward wall 66 of the cassette 62 by actuation means (not shown) associated with the magnetic tape transport. A first reproduce or playback head 102 and a second reproduce or playback head 104 is mounted on the sub-chassis 100 by mounting straps 106 and fasteners 108. Depressing the playback key 44 causes the actuation means to move the sub-chassis 100 from an inoperative position (FIG. 4) to an operative position (FIG. 5). When the sub-chassis 100 is in the operative position, the magnetic tape 76 is in contact with the sensing surface 110 of the playback head 102 and the sensing 112 surface of the playback head 104. Pressure pads (not shown) associated with the conventional compact cassette 62 and the transport means press the magnetic tape 76 against the sensing surface 110, of the playback head 102.

The first playback head 102 is provided to respond to or pick up the super-imposed cue tone and audio program signals during the normal playback mode. The signal output of the playback head 102 is processed by electrical circuitry (not shown) to provide an audio output thru the loudspeaker (not shown) and cue tone signals to visually advance the filmstrip in synchronism with the audio program. As is well known in the art, the first playback head 102 may also be utilized to record both audio and cue tone signals on the magnetic tape 76. The second playback head 104 is of conventional design but modified in accordance with the teaching of the present invention.

Figure 6A:
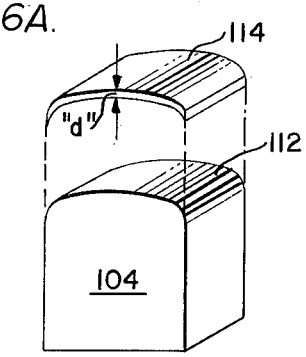
FIG. 6A is a perspective view of a playback head and a spacer showing the spacer separated rom the sensing surface of the head.
Figure 6B:
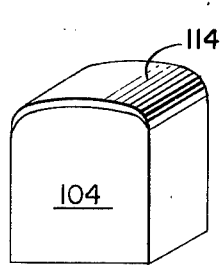
FIG. 6B is a view of the playback head and spacer illustrated in FIG. 6A with the spacer secured to the sensing surface of the playback head.

In accordance with the present invention, a non-magnetic spacer 114 is interposed between the sensing surface 112 of the second playback head 104 and the magnetic tape 76. An exemplary spacer 114 and playback head 104 are shown in FIGS. 6A and 6B. In FIG. 6A the spacer 114 is shown separated from the curvlinear sensing surface 112 of the playback head 104 and in FIG. 6B the spacer 114 is shown attached to the sensing surface 112 of the playback head 104. The spacer 114 is shaped to conform to the curvelinear profile of the sensing surface 112 and has a finite thickness "d." During the playback mode the magnetic tape 76 is maintained in contact with the extrados or exterior surface of the spacer 114 and thereby spaced or separated from the sensing surface 112 of the playback head 104 by a distance equal to the thickness of the spacer "d." The spacer 114 may be formed from a nonmagnetic material, such as a plastic, a ceramic, or other suitable material and secured to the sensing surface 112 of the playback head 104. The spacer 114 may be secured to the sensing surface 112 by means of an adhesive or cement, or by other means including discrete fasteners. Alternately, the spacer 114 may be molded directly onto the sensing surface 112 of the playback head 104 using a moldable resin. In the preferred embodiment, the spacer 114 is fabricated from aluminum and secured to the sensing surface 112 of the playback head 104 by means of a epoxy base cement.

Spacing the magnetic tape 76 a preselected distance "d" from the sensing surface 112 of the playback head 104 provides a wave length dependent spacing loss "SL" in accordance with the following formula:

$$SL = 54.6 \ (d/\lambda) \ dB$$

where:
 d is the distance the magnetic tape is spaced from the sensing surface of the playback head and
 λ is the wave length of the recorded signal on the magnetic tape.

This relationship was reported by Mr. R. L. Wallace Jr. in an article entitled "The Reproduction of Magnetically Recorded Signals" and published in the Bell System Technical Journal, Part II, Volume 30, Number 4, Page 1145, October 1951.

The wave length of the signal on the magnetic tape 76 is established during the recording of the signal. The wave length is directly proportional to the linear velocity of the magnetic tape 76 as it is transported past the recording head surface and inversely proportional to the frequency of the signal. For example, a 50 Hz sinusoidal signal recorded at 1.875 in/sec will have a recorded wave length of 0.0375 in., and a 125 Hz sinusoidol signal recorded at the same 1.875 in/sec will have a recorded wave length of 0.015 in.

Figure 7:
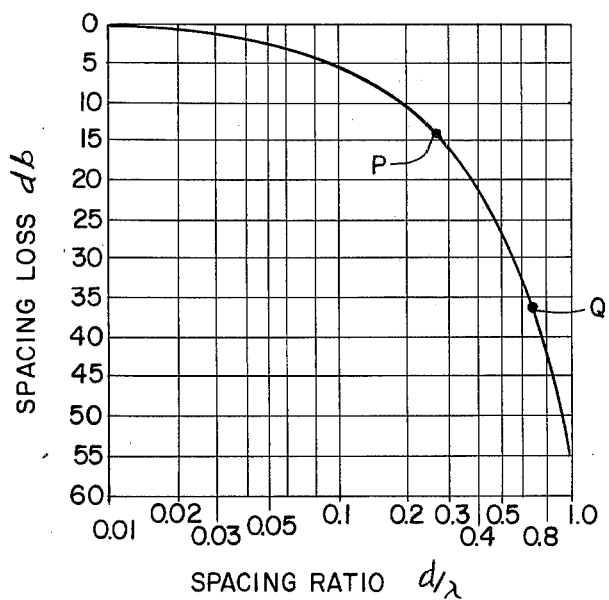
FIG. 7 is an idealized graphical representation of spacing loss (ordinate) with respect to the spacing ratio $d/\tau$ (abscissa)

FIG. 7 is a graphical representation of the spacing loss in dB (ordinate) with respect to the spacing ration d/λ (abcissa). As is indicated by the relationship above, the spacing loss for a preestablished spacing "d" is inversely proportional to the wave length of the recorded signal and is independent of the linear tape velocity past the reproducing or playback head. The spacing loss relation provides a means whereby the longer wave length cue tones can be reliably separated from the shorter wave length audio program signals regardless of the velocity of the magnetic tape 76 as it is transported past the sensing surface 112 of the playback head 104.

While many spacing distances "d" may be selected, applicant has found that a range from 0.008 in. to 0.018 in. to be satisfactory, and 0.010 in. preferable. For a spacer 114 having a "d" equal to 0.010 in. the spacing loss for a 50 Hz cue tone signal is 14.56 dB (FIG. 7, point P) and the spacing loss for a 125 Hz signal (representing the lower end of the audio program frequency spectrum) is 36.4 dB (FIG. 7, point Q). Assuming that the cue tone and audio program signal amplitudes are approximately equal when they are recorded, the interposed 0.010 in. spacer 114 provides a significant 21.84 dB difference between the 50 Hz cue tone signal and 125 Hz audio signal. The attenuation of the shorter wave length audio signals relative the longer wave length cue tone signals is independent of the linear tape velocity during the fast/forward or rewind mode and allows the applicant to achieve an accurate cue tone count independent of the magnetic tape 76 linear velocity during rewind and fast/forward.

FIG. 8 illustrates a functional block diagram showing means to provide a pulse output in response to the cue tone signals recorded on the magnetic tape, pulse counter means to count the cue pulses for comparison with the visual presentation pulse counter, and solenoid means to stop the tape transport. Waveshape illustrations representing the signal output of selected functional blocks are also shown in FIG. 8. Circuitry which provides some of the functions illustrated in FIG. 8 is shown in FIG. 10 and described in detail below.

Referring to FIG. 8 the voltage induced into the playback head 104 representing the longer wave length cue tones and the shorter wave length but more highly attenuated audio program material is amplified thru a low noise-high gain pre-amplifier 116. Exemplary waveform envelopes for the pre-amplifier 116 output and the equalizing amplifier 118 output are illustrated in idealized schematic form, at 200 and 201, respectively. These two waveforms, as well as others described below, are not drawn to scale. The output 201 of the equalizing amplifier 118 is essentially a sine wave representing the cue tone signals and a highly attenuated shorter wave length audio signal component. This signal is inputted thru an amplifier 120 whose gain is such that the amplifier 120 saturates to provide a clipped sine wave output 202. The clipped sine wave 202 is inputted to a ramp generator 122 (frequency to voltage converter) whose output 203 rises in response to the number of input cycles. The ramp voltage 203 is inputted to a Schmitt trigger 124 which initiates an output pulse 204 when the ramp input voltage rises above a predetermined trigger level and terminates the output pulse 204 when the input voltage falls from the trigger level. The pulse 204 represents a cue tone. The pulse 204 width and spacing will vary according to both the linear tape velocity during rewind or fast/forward, and the pulse 204 width and spacing as recorded on the magnetic tape 76.

Digital circuitry, shown in functional block form in FIG. 8, is used to count both the cue tone pulses 204 and pulses representing the visual presentation, compare the cue tone and visual presentation counts and issue an appropriate control signal. An asynchronous up/down binary counter 126 is provided to count the cue tone pulse 204 output of the Schmidt trigger 124. In an analogous manner, another asynchronous up/down binary counter 128 is provided to count the visual presentation pulse 205 output of a pulse generator 130 which issues a pulse 205 each time the visual presentation is changed. A comparator 132 compares the count states of the cue tone counter 126 and the visual presentation counter 128 and issues a control signal to a solenoid driver 134 when the count states of the two counters 126 and 128 are equal.

The following two examples in combination with FIGS. 9A, 9B, 9C, 9D, 9E, and 9F illustrate the functions of the digital circuitry. The various illustrations of FIG. 9 are idealized graphical representations of a filmstrip 136 segment with four visual presentations W, X, Y, and Z thereon, and a segment 138 of the magnetic tape 76 associated with these visual presentations. The magnetic tape segment 138 has cue tone burst W', X', Y', and Z' recorded thereon, and audio signals W'', X'', Y'', and Z'' also recorded thereon in super-imposed fashion. As is conventional, the audio signals W'', X'', Y'', and Z'' occupy the space between the cue tone bursts W', X', Y', and Z'. A projector means 140, represented in functional block form is located adjacent the filmstrip segment 138. The playback head 104 is located adjacent the magnetic tape segment 138. During the playback mode and the fast/forward mode the magnetic tape segment 138 is transported past the playback head 104 in the direction shown by the arrow 142. During the rewind mode the magnetic tape segment 138 is transported past the playback head 104 in the direction shown by the arrow 144.

During the playback mode (FIG. 9A), the magnetic tape segment 138 is transported past the playback head 104 in the direction of the arrow 142. The cue tone W' will cause the projector 10 to increment to the W visual presentation and the audio signal W''', relating to the visual presentation W, will be sensed by the playback head 102 (not shown) and reproduced thru the projector 10 loudspeaker. The next cue tone burst on the magnetic tape segment 138, X', will cause the projector 10 to increment to the X visual presentation, and the audio signal X'', relating to the visual presentation X, will be reproduced thru the projector 10 loudspeaker, and so forth.

In the case where the projector 10 operator wishes to skip visual presentations previously learned, and advance to a subsequent point in the audio visual presentation, the projector operator manually depresses the synchronization button 48 to reset both the cue tone counter 126 and the visual presentation counter 128 states to zero. If the visual presentation and audio program were initially synchronized, the depression of the button 48 may be omitted. The forward button 30 is used to manually increment visual presentation in the forward direction to the selected visual presentation. Switch means and circuitry (not shown) associated with the forward button 30 enable the visual presentation counter 128 for up counting. Pulses 205 generated by the visual presentation pulse generator 130 cause the visual presentation counter 128 to increment one binary number in the up direction for each manually incremented visual presentation. Referring to the specific example of FIG. 9A and FIG. 9B, the projector 10 operator may manually increment from the visual presentation W, FIG. 9A, to the visual presentation Z, FIG. 9B, by depressing the forward button 30 three times and causing the visual presentation counter 128 to count to binary 3. Circuitry (not shown) causes the indicator lamps 54 below the play key 44 and the indicator lamp 52 below the fast/forward key 42 to illuminate. The projector 10 operator, in response to the illuminated indicator lamps 54 and 52, then depresses both the play key 44 and the fast/forward key 42 to cause the sub-chassis 100 to move into operative engagement with the magnetic tape segment 138 (FIG. 5) and cause the tape transport to fast/forward the magnetic tape segment 138 in the direction of the arrow 142. Switch means and circuitry (not shown) associated with the fast/forward key 42 enable the cue tone counter 126 for up counting. As the magnetic tape segment 138 is transported past the playback head 104 in the forward direction the cue tone signals will be processed into pulses 104 as described above to cause the cue tone counter 126 to increment one binary number in the up direction for each cue tone. When the cue tone counter 126 state equals the visual presentation counter 128 state, the comparator 132 will issue a signal to extinguish the illuminated indicator lamps 52 and 54 and cause the driver 134 to operate a solenoid 146 to release the depressed play key 44 and the fast/forward key 32. In the specific example illustrated in FIG. 9, the cue tone counter 126 will count three cue tone pulses 204, X', Y', Z' and the digital circuitry will cause the tape transport to stop (FIG. 9C) at a point just following the Z' cue tone burst but on or before the audio signal Z''. Thus when the visual presentation has been incremented in the forward direction n times, the digital circuitry will stop the magnetic tape transport when n cue tones have been counted by the cue tone counter 126. The synchronized audio visual program may then be resumed by depressing the play key 44. In the case of the specific example of FIG. 9C, depressing the play key 44 will cause the audio signal Z'' relating to the projected visual presentation Z to be reproduced thru the loudspeaker.

Figure 9A:
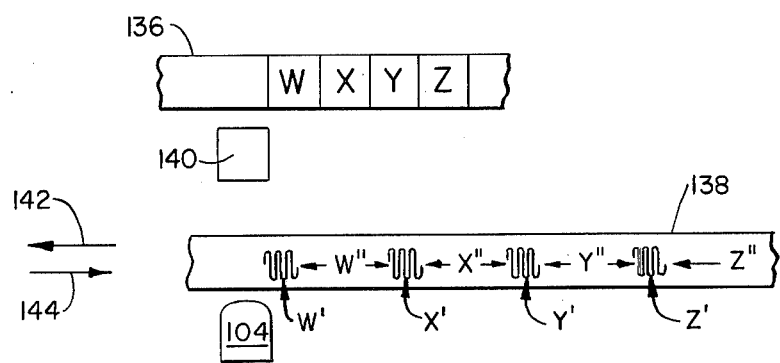
FIGS. 9A, 9B, 9C, 9D, 9E, and 9F are idealized graphical representations of a filmstrip segment having four visual presentations W, X, Y, and Z thereon, a corresponding magnetic tape segment having superimposed cue tone signals W', X', Y', and Z'; and audio signals W", X", Y", and Z" recorded thereon.
Figure 9B:
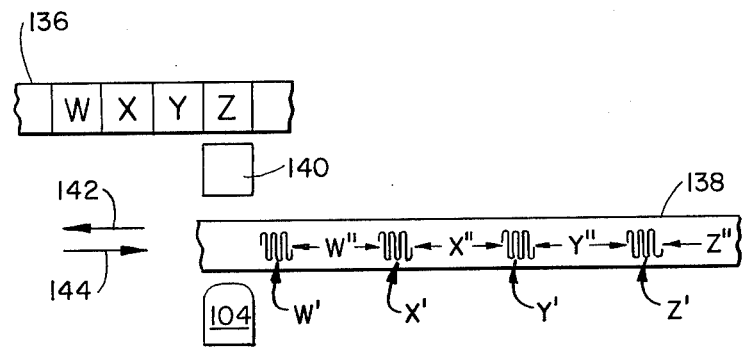
Figure 9C:
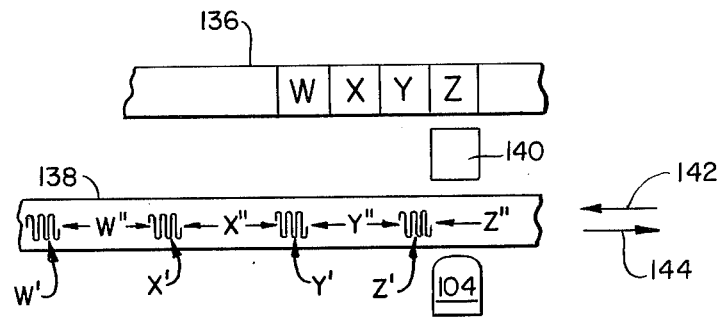
Figure 9D:
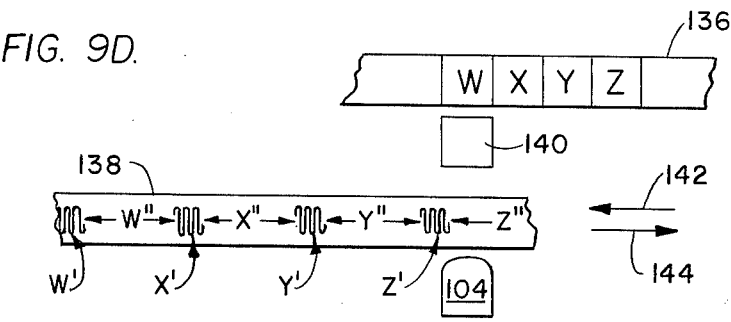
Figure 9E:
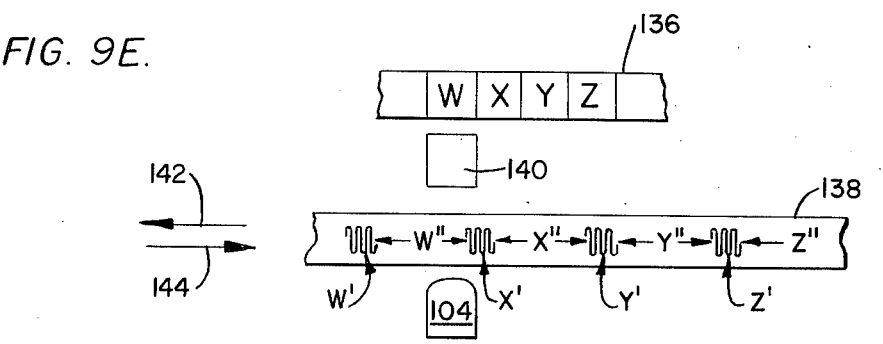
Figure 9F:
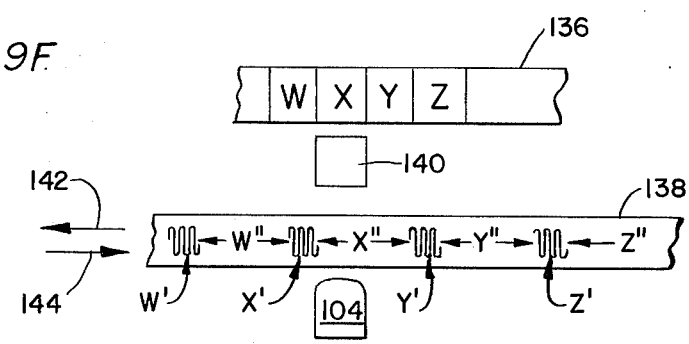

In the case where the projector 10 operator wishes to return to a prior point in the audio visual program for review purposes, the operator manually depresses the synchronization button 48 to reset both the cue tone counter 128 and the visual presentation counter 128 states to zero. If the visual presentation and audio program were initially synchronized, the depression of the button 48 may be omitted. The reverse button 32 is used to manually decrement the visual presentation in the reverse direction to the desired visual presentation. The visual presentation is then decremented one additional visual presentation beyond the desired visual presentation. The reason for decrementing this one additional visual presentation will be evident from the description below. The switch means and the circuitry (not shown) associated with the reverse button 32 enable the visual presentation counter 128 for down counting. Pulses 205 generated by the visual presentation pulse generator 130 cause the visual presentation counter 128 to decrement one binary number in the down direction for each manually decremented visual presentation. Referring to FIG. 9C, the projector 10 operator may manually decrement from the visual presentation Z to the visual presentation X by depressing the reverse button 32 two times and causing the visual presentation counter 128 to count down to binary 2. As mentioned above, it is necessary that the projector 10 operator decrement the visual presentation one additional visual presentation to W (FIG. 9D) causing the visual presentation counter 128 to count to binary 3. Circuitry (not shown) causes the indicator lamp 54 located below the play key 44 and the indicator lamp 50 located below the rewind key 40 to illuminate. The projector 10 operator, in response to the illuminated indicator lamps 50 and 54, depresses both the play key 44 and the rewind key 40 to cause the sub-chassis 100 to move into operative engagement with the magnetic tape segment 138 (FIG. 5) and cause the tape transport to rewind the magnetic tape segment 138 in the direction of the arrow 144. Switch means and circuitry (not shown) associated with the rewind key 40 enable the cue tone counter 126 for down count. As the magnetic tapes segment 138 is transported past the playback head 104 in the reverse direction, the cue tone signal are processed into pulses 204 as described above to cause the cue tone counter 126 to count one binary number for each cue tone. When the cue tone counter 126 state equals the visual presentation counter 128 state, the comparator 132 will issue a signal to extinguish the illuminated indicator lamps 54 and 50 and cause the solenoid driver 134 to operate the solenoid 146 to release the depressed play key 44 and the depressed rewind key 40 and thereby stop the tape transport. Referring to the specific example of FIGS. 9D and 9E, the cue tone counter 126 will count three cue tone pulses 204 representing Z', Y', and X' and the digital circuitry will stop the magnetic tape segment 138 at a point on the tape just before the X' cue tone burst (FIG. 9E). When the audio visual program is resummed by depressing the play key 44 the magnetic tape transport 138 will be transported in the direction of the arrow 142. The X' cue tone will immediately be detected and cause the visual presentation to the desired X visual presentation thereby causing the visual presentation to be synchronized with the audio program.

FIG. 10 illustrates a schematic diagram that provides some of the functions illustrated in the block diagram of FIG. 8. The playback head 104 output voltage represents the attenuated shorter wavelength audio signals mixed with less attenuated longer wavelength cue tone signals. As previously defined herein, the term mixed denotes simultaneous superimposed recordings, where the cue tone signals is recorded directly over the audio information signal, and sequential superimposed recording, where the audio information signal is recorded between adjacent cue tone signals. As is well known in the art, the playback head 104 output rises with frequency at a rate of 6 dB/octave. The playback head 104 output voltage is applied across an impedance matching resistor R1 and thru a DC decoupling capacitor C1 to the base of a transistor Q1 pre-amplifier 116. The pre-amplifier 116 transistor Q1 is a NPN bipolar transistor in common emitter mode biased by a resistor R2, a resistor R3 and with feedback provided by a resistor R4. The transistor Q1 is selected for its low noise, high gain characteristics. The pre-amplifier 116 output is fed thru a high pass filter formed from a capacitor C2 and a resistor R5. The high pass filter is designed to suppress noise below 250 Hz. Such noise arises from 60 Hz hum, the magnetic tape, and the pre-amplifier components. After filtering the signal is inputted to the equalizing amplifier 118 formed from amplifying element IC1. The gain of IC1 is determined by a resistor R6 and a capacitor C3 in parallel and a resistor R7. These components are selected to provide a gain with a 6 dB/octave roll off to equalize the playback head 104 output characteristic. The output of the amplifier 118 is such that any signal of a frequency higher than that of the cue tones is greatly attenuated. The output of the amplifier 118 is inputted to the saturating amplifier 120 formed from amplifying element IC2 thru a DC decoupling capacitor C4, and a resistor R8. The gain of IC2 is determined by a resistor R9 and a resistor R10 and is selected to cause the amplifier 120 to saturate readily to produce a clipped output (waveform 202, FIG. 8). The purpose of the saturating amplifier 120 is to provide a well defined voltage level for input to the succeeding circuits, described above. The gain of IC2 is so selected that the weakest amplitude cue tone signal within the range expected cue tone signal amplitudes will cause the amplifier 120 to saturate. The output IC2 is inputted thru a capacitor C5 and a resistor R11 to the ramp generator 122 circuit formed from IC3 and resistors R12, R13 and capacitor C6. The ramp generator 122 integrates the input to charge capacitor C6 and provide a linear positive going ramp output voltage (waveform 203, FIG. 8) which increases in proportion to the number of input cycles from the amplifier 120. The ramp output is fed into a Schmitt trigger 124 formed from IC4 to provide an output pulse (waveform 204, FIG. 8) when the ramp input rises above a predetermined trigger level. The slope of the ramp output of the ramp generator 122, which is determined by the charge rate on the capacitor C6, and the trigger level of the Schmitt trigger 124, is selected to cause a pulse 204 to be generated for the shortest duration cue signal within the expected range of cue tone signal durations. The pulses 204 can then be counted in the cue tone counter 126 and the counter 126 state compared to the visual advance counter 128 state as described above.

The embodiment described above uses a spacer 114 secured to the playback head 104 or a spacer molded directly to the second head using a resin. In an alternate embodiment illustrated in FIG. 10, a spacer 148 is pivotably attached to the playback head 104 at pivot 150. During normal playback the spacer 148 is rotated away (broken line illustration) from the playback head 104 to allow normal reproduction of the cue tones the audio program material. During fast forward and rewind, the spacer 148 is rotated about its pivot 150 and interposed between the playback head 104 and the magnetic tape 76. The output of the playback head 104 is then switched to the circuitry described above to provide accurate cue tone counting.

The present invention, when in incorporated into the audio visual equipment as described above, overcomes the draw backs which have characterized the prior art and provides a new method of searching for the selected visual presentation and quickly regaining audio visual synchronization between the selected visual presentation and the associated magnetic tape.

For example, a student utilizing the preferred embodiment may search visual presentations in the forward direction to a subsequent visual presentation in the audio visual program and avoid material previously learned. Using the forward button 30 the student increments the visual presentation in the forward direction until the desired visual presentation is reached at which point the forward visual presentation incrementing is stopped. As described in detail above, the magnetic tape 76 is then transported past the playback head 104 and is stopped when the audio signals recorded on the magnetic tape 76 corresponds to the selected visual presentation. More specifically, the visual presentation counter 128 counts and stores the number of visual presentations incremented. The magnetic tape 76 is then fast forwarded past the playback head 104, the cue tone pulses are sensed, counted, and stored by the cue tone counter 126. When the cue tone counter 126 and the visual presentation counter 128 have equal count states the transporting of the magnetic tapes 76 is stopped. The synchronized audio visual program may then be resumed.

In addition to searching visual presentations in the forward direction, the student may search the visual presentations in the reverse direction to a prior point in the audio visual program to review material. Using the reverse button 32 the student decrements the visual presentation in the reverse direction. As described in detail above, the magnetic tape 76 is then transported past the playback head 104 and stopped at the appropriate point on the magnetic tape 76. When the audio visual program is resummed, the visual presentation increments one visual presentation in the forward direction and audio visual synchronization is achieved.

In both of the examples above, the student need not rewind or fast/forward the magnetic tape transport on a trial and error bases to locate the desired point in the audio visual program.

In contrast to the methods described above, where the visual image projector is operated in either the forward direction or the reverse direction and the magnetic tape transport means is thereafter synchronized with the visual presentation, the magnetic tape transport means may be operated in either the forward or reverse direction and the visual image projector there after synchronized with the audio program. The following two examples are illustrative.

The student may fast/forward the magnetic tape transport means in the forward direction to a subsequent audio program segment. As the magnetic tape is transported in the forward direction, the cue pulses are counted by the counter 126 as described. The indicating means 50 and the indicating means 54 are caused to illuminate by circuitry (not shown). The projector operator then increments the visual presentations in the forward direction by repeatedly actuating the forward button 30. The visual presentation changes are counted by the counter 128 as described above. When the cue tone count and the visual presentation count are equal, the indicating means 50 and 54 are extinguished to indicate that synchronization has been achieved between the visual presentation and the audio program segment.

In a somewhat analogous manner, the magnetic tape transport means may be placed in the rewind mode to rewind the magnetic tape to a previous audio program segment. As the magnetic tape is transported in the reverse direction, the cue tones are counted by the counter 126 as described above. The indicating means 52 and 54 are caused to illuminate by circuitry (not shown). The projector operator then decrements the visual presentations in the reverse direction by repeated actuation of the reverse button 32. The visual presentations changes are counted by the counter 128. When the cue tone count and the visual presentation count are equal, the indicating means 52 and 54 are extinguished to indicate that synchronization between the visual presentation and the audio program has been achieved.

As is readily apparent to one skilled in the art, motorized means may be incorporated into the visual presentation projector to automatically increment the visual presentation in the forward direction or the reverse direction until synchronization is achieved.

As will be apparent to those skilled in the art various changes and modifications may be made to the preferred embodiment of the invention described herein without departing from the scope of the invention as determined by the appended claims and their legal equivalent.

I claim:

1. Apparatus for a magnetic tape playback machine to attenuate recorded audio signals relative to superimposed control signals during fast forward or fast rewind of said magnetic tape where the audio signals have been recorded in a first frequency range and the control signals have been recorded in a second frequency range and where the second frequency range is less than the first frequency range comprising:
   a playback head having a sensing surface for sensing signals recorded on said magnetic tape;
   magnetic tape transport means for supporting and transporting said magnetic tape past said sensing surface of said playback head in said fast forward or said fast rewind direction;
   a spacer having a thickness dimension mounted on said sensing surface of said playback head to space the magnetic tape from said sensing surface of said playback head during said fast forward or fast rewind motion;
   whereby the frequency response versus the playback head to magnetic tape spacing characteristic attenuates said higher frequency audio signals relative to said lower frequency control signals.

2. The apparatus claimed in claim 1 wherein:
said second frequency range extends from 45 to 60 Hz 3. The apparatus claimed in claim 2 wherein:
said second frequency range is 50 Hz ± 5%.

4. The apparatus claimed in claim 2 wherein:
said first frequency range extends from 125 Hz to 20,000 Hz.

5. The apparatus claimed in claim 1 wherein said magnetic tape transport means further comprises:
   a playback mode for transporting said magnetic tape in a first direction past said sensing surface of said playback head at a first speed;
   said fast forward mode transporting said magnetic tape in said first direction past said sensing surface of said playback head at a second speed;
   said fast rewind mode transporting said magnetic tape in a second direction past said sensing surface of said playback head at said second speed.

6. The apparatus claimed in claim 5 wherein:
said first speed is 1.875 in/sec; and
said second speed is a speed range of six to 24 times said first speed range.

7. The apparatus claimed in claim 6 wherein:
said magnetic tape is contained within a compact cassette.

8. The apparatus claimed in claim 1 wherein:
said thickness dimension of said spacer is in the range of 0.008 in. to 0.018 in.

9. The apparatus claimed in claim 8 wherein:
said thickness dimension of said spacer is 0.010 in.

10. The apparatus claimed in claim 8 wherein:
said spacer is fabricated from a non-magnetic material.

11. The apparatus claimed in claim 10 wherein:
said spacer is fabricated from aluminum.

12. The apparatus claimed in claim 11 wherein:
said spacer is adhesively secured to said sensing surface of said playback head.

13. The apparatus claimed in claim 5 wherein:
said spacer is moveably mounted relative said sensing surface of said playback head and is selectvely moveable onto said sensing surface of said playback head.

14. The apparatus claimed in claim 1 wherein:
said spacer causes attenuation of said higher frequency audio signals relative to said lower frequency control signals in accordance with the following formula $$SL = 54.6 \, (d/\lambda) \text{ dB}$$

where
$SL$ is the frequency dependent spacing loss,
$d$ is the distance the magnetic tape is spaced from the sensing surface of the playback head, and $\lambda$ is the wavelength of the recorded signal on the magnetic tape.

15. A method for use with magnetic tape playback machine for attenuating a recorded audio signal relative to a superimposed control signal comprising the steps of:
transporting magnetic tape having audio signals and super-imposed control signals recorded thereon past the sensing surface of a magnetic tape playback head in a fast forward or a fast rewind direction where the audio signals have been recorded in a first frequency range and the control signals have been recorded in a second frequency range and where the second frequency range is less than the first frequency range;
spacing said magnetic tape a distance away from said sensing surface of said magnetic tape playback head during said fast forward or fast rewind motion;
whereby the frequency response versus the playback head to magnetic tape spacing characteristic attenuates the higher frequency audio signals relative the lower frequency control signals.

16. The method claimed in claim 15 wherein:
said second frequency range is 45 to 60 HZ.

17. Method claimed in claim 16 wherein:
said second frequency range is 50 Hz $\pm$ 5%.

18. The method claimed in claim 15 wherein:
said first frequency range extends from 125 Hz to 20,000 Hz.

19. The method claimed in claim 15 wherein:
said spacing distance of said magnetic tape is in the range of 0.008 to 0.018 in.

20. The method claimed in claim 19 wherein:
said spacing distance of said magnetic tape is 0.010 in.

21. The method claimed in claim 15 wherein:
said spacing distance attenuates the higher frequency audio signals relative to the lower frequency control signals in accordance with the following formula $$SL = 54.6 \, (d/\lambda) \text{ dB}$$

where
$SL$ is the frequency dependent spacing loss,
$d$ is the distance the magnetic tape is spaced from the sensing surface of the playback head, and $\gamma$ is the wavelength of the recorded signal on the magnetic tape.

22. Apparatus to regain synchronism between a visual presentation projected by a visual image projector with an audio program reproduced by a magnetic tape playback machine after one is operated out of synchronization with respect to the other where the magnetic tape includes audio signals of a first frequency range superimposed with control signals of a second frequency range and where the second frequency range is less then the first frequency range comprising:
a visual image projector for projecting a visual presentation from a film media
counting means associated with said visual image projector to count one unit for each visual presentation changed;
a playback head having a sensing surface for sensing signals recorded on magnetic tape;
magnetic tape transport means for supporting and transporting magnetic tape past said sensing surface in a playback mode, a fast forward mode and a fast rewind mode;
a spacer having a thickness dimension movably mounted on said sensing surface of said playback head to space said magnetic tape from said sensing surface during said fast forward or fast rewind mode whereby the frequency response versus the playback head to magnetic tape spacing characteristic attenuates said higher frequency audio signals relative said lower frequency control signals;
electronic means connected to said playback head to process said relatively unattenuated control signals;
counting means connected to said electronic means to count said processed control signals;
means to compare said visual presentation count with said control signal count.

23. The apparatus claimed in claim 22 wherein:
said second frequency range extends from 45 Hz to 60 Hz.

24. The apparatus claimed in claim 23 wherein:
said second frequency range is 50 Hz $\pm$ 5%.

25. The apparatus claimed in claim 22 wherein:
said first frequency range extends from 125 Hz to 20,000 Hz.

26. The apparatus claimed in claim 22 wherein said magnetic tape transport means further comprises;
said playback mode transporting said magnetic tape in a first direction past said sensing surface of said playback head at a first speed;
said fast forward mode transporting said magnetic tape in said first direction past said sensing surface of said playback head at a second speed;
said rewind mode transporting said magnetic tape in a second direction past said sensing surface of said playback head at a second speed.

27. The apparatus claimed in claim 26 wherein;
said first speed is 1.875 in./sec;
said second speed is a speed range of six to 24 times said first speed.

28. The apparatus claimed in claim 27 wherein:
said magnetic tape is contained within a compact cassette.

29. The apparatus claimed in claim 22 wherein said thickness dimension of said spacer is in the range of 0.008 to 0.018 in.

30. The apparatus claimed in claim 29 wherein:

said thickness dimension is 0.010 in.

31. The apparatus claimed in claim 29 wherein:
said spacer is fabricated from a non-magnetic material.

32. The apparatus claimed in claim 31 wherein:
said spacer is frabricated from aluminum.

33. The apparatus claimed in claim 32 wherein:
said spacer is adhesively secured to said sensing surface of said playback head.

34. The apparatus claimed in claim 31 wherein:
said spacer is moveably mounted relative said sensing surface of said playback head and is selectively moveable onto said sensing surface of said playback head.

35. The apparatus claimed in claim 22 wherein:
said spacer causes attenuation of said high frequency audio signals relative said low frequency control signals in accordance with the following formula $$SL = 54.6 (d/\lambda) \text{ dB}$$

where
- $SL$ is the frequency dependent spacing loss,
- $d$ is the distance the magnetic tape is spaced from the sensing surface of the playback head, and
- $\lambda$ is the wavelength of the recorded signal on the magnetic tape.

36. The apparatus claimed in claim 22 wherein:
said visual image projector is a rear screen filmstrip projector.

37. The apparatus claimed in claim 22 wherein:
said counting means associated with said visual image projector is a bi-directional counter adapted to increment one unit for each visual presentation advance in a first direction and decrement one unit for each visual presentation advanced in a second direction;

said counting means connected with said electrical means is a bi-directional counter adapted to increment one unit for each control signal detected when the magnetic tape is transported in said first direction and decrement one unit for each control signal detected when said magnetic tape is transported in said second direction.

38. The apparatus claimed in claim 32 further comprising:
means to stop the transporting of said magnetic tape by said magnetic tape transport means when said visual presentation counter and said control signal counter states are equal.

39. The apparatus claimed in claim 22 wherein said electronic means further comprises:
- a first amplifier means to amplify said lower frequency control signals and relatively attenuated higher frequency audio signals sensed by said playback head;
- a second amplifier means operated in a saturated state connected to said first amplifier means;
- a ramp generator which generates a voltage output in proportion to the output of the second amplifier means;
- a pulse producing means to produce an output pulse when said ramp rises above a pre-determined trigger level.

40. A method of regaining sychronization between a visual presentation projected by a visual image projector with an audio program reproduced by a magnetic tape playback machine after one is operated out of synchronism with respect to the other where the magnetic tape includes an audio signal recorded at a first frequency range super-imposed with a control signal recorded at a second frequency range and where the second frequency range is less then the first frequency range comprising the steps of:
- counting the visual presentation as they are presented;
- transporting said magnetic tape past a sensing surface of a magnetic tape playback head in a playback mode, a fast forward mode and a fast rewind mode of a magnetic tape playback head;
- spacing said magnetic tape a distance away from said sensing surface during said fast forward or fast rewind mode whereby the frequency response versus the playback head to magnetic tape spacing characterisitic attenuates said first frequency range relative to said second frequency range;
- counting the relatively unattenuated control signals of said first frequency range sensed by the magnetic tape playback head;
- comparing the visual presentation count with the control signal count;
- stopping the transporting of the magnetic tape past the sensing surface when the visual presentation count equals the control signal count.

41. The method claimed in claim 40 wherein:
said second frequency range is 45 to 60 Hz.

42. The method claimed in claim 41 wherein:
said second frequency range is 50 Hz ± 5%.

43. The method claimed in claim 40 wherein:
said first frequency range is 125 Hz to 20,000 Hz.

44. The method claimed in claim 40 wherein:
said spacing distance of said magnetic tape is in the range of 0.008 in to 0.0018 in.

45. The method claimed in claim 44 wherein:
said spacing distance of said magnetic tape is 0.010 in.

46. The method claimed in claim 40 wherein:
said spacing attenuates the higher frequency audio signals relative the lower frequency control signals in accordance with the following formula $$SL = 54.6 (d/\lambda) \text{ dB}$$

where
- $SL$ is the frequency dependent spacing loss,
- $d$ is the distance the magnetic tape is spaced from the sensing surface of the playback head, and
- $\lambda$ is the wavelength of the recorded signal on the magnetic tape.

* * * * *